United States Patent [19]

Sakai et al.

[11] Patent Number: 4,782,355

[45] Date of Patent: Nov. 1, 1988

[54] POWER SOURCE DEVICE

[75] Inventors: Shinji Sakai, Yokohama; Ryosuke Miyamoto, Kawasaki, both of Japan

[73] Assignee: Canon Kabushiki Kaisha, Tokyo, Japan

[21] Appl. No.: 877,264

[22] Filed: Jun. 23, 1986

[30] Foreign Application Priority Data

| Jun. 26, 1985 | [JP] | Japan | 60-139916 |
| Jun. 26, 1985 | [JP] | Japan | 60-139917 |
| Jun. 26, 1985 | [JP] | Japan | 60-139918 |

[51] Int. Cl.$^4$ .................. G03B 3/00; G03B 5/00; G03B 7/26; G06F 11/00
[52] U.S. Cl. .................. 354/400; 354/455; 354/484; 354/195.1; 354/412; 358/909; 307/296 R; 364/900; 361/1
[58] Field of Search .............. 354/484, 286, 295, 412, 354/289.12, 400, 402, 455, 195.1; 307/296 R, 200 A; 365/226, 227; 364/707, 200 MS File, 900 MS File; 361/1, 62, 66

[56] References Cited

U.S. PATENT DOCUMENTS

| 3,803,554 | 4/1974 | Bock et al. | 365/227 |
| 4,057,327 | 11/1977 | Kumazawa | 354/195.1 X |
| 4,464,034 | 8/1984 | Tomino | 354/286 |
| 4,477,164 | 10/1984 | Nakai et al. | 354/286 |
| 4,529,288 | 7/1985 | Nakai et al. | 354/286 X |
| 4,553,204 | 11/1985 | Hashimoto | 364/200 |
| 4,568,165 | 2/1986 | Ishibashi | 354/195.1 |
| 4,589,753 | 5/1986 | Kawai | 354/286 |

Primary Examiner—W. B. Perkey
Attorney, Agent, or Firm—Toren, McGeady & Associates

[57] ABSTRACT

A power source system including a power source device and an external device connected to said power source device, in which the connection between the power source device with the external device is firstly confirmed, then the power is supplied from the power source device to the external device when a predetermined output of said power source device has been obtained, while a first signal is transmitted from said power source device to the external device connected thereto, and the supply of power is stopped if a predetermined signal is not fed from said external device.

158 Claims, 8 Drawing Sheets

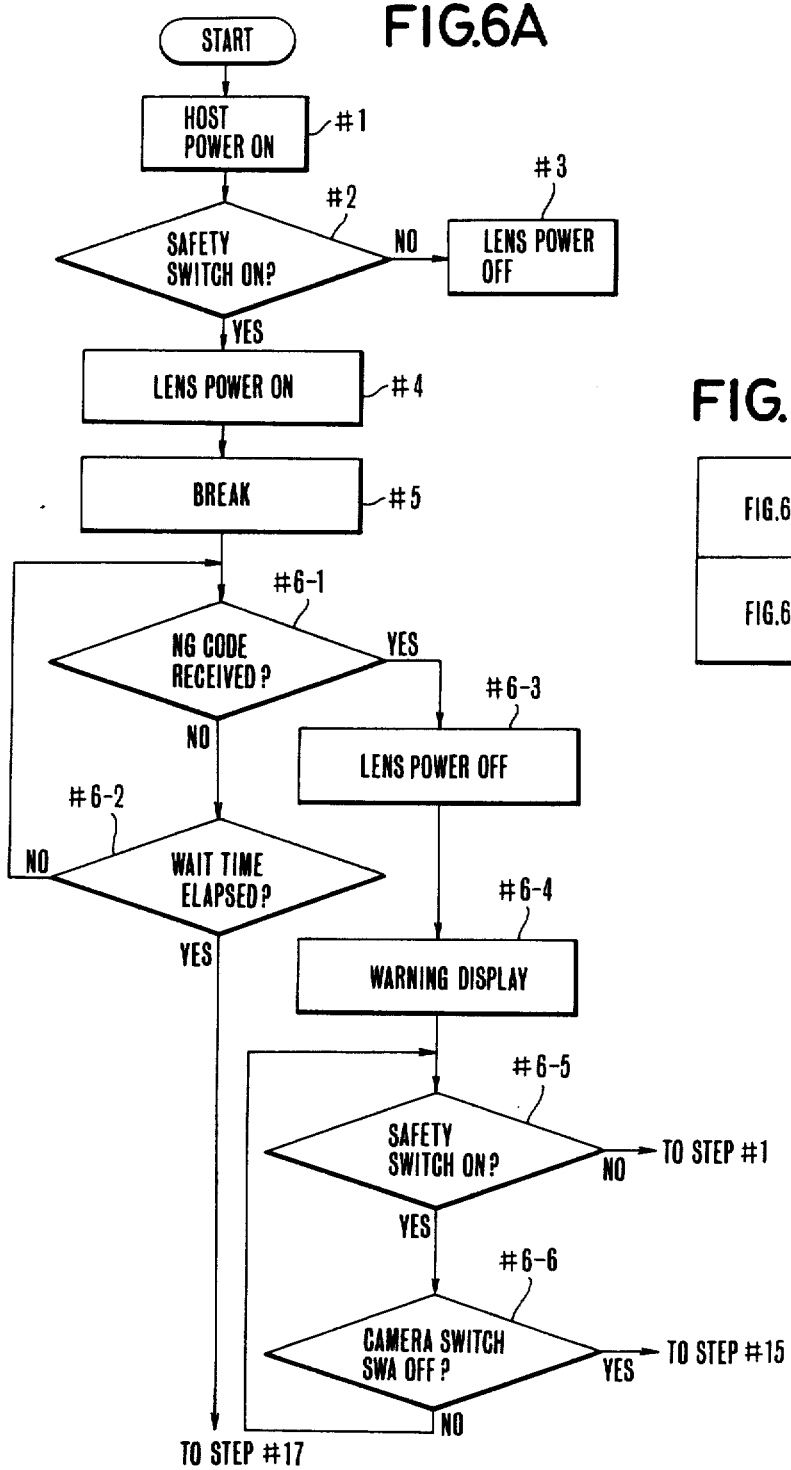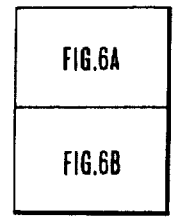

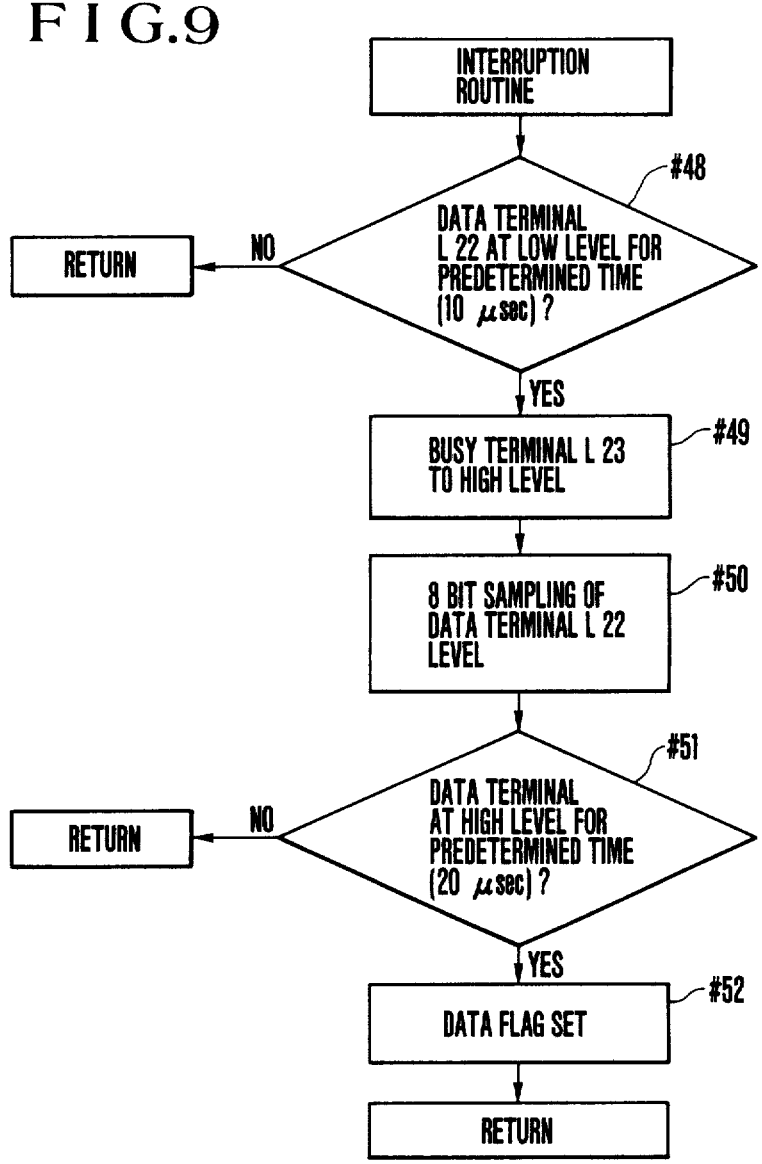

POWER SOURCE DEVICE

BACKGROUND OF THE INVENTION

1. Field of the Invention

The present invention relates to a power source device for controlling power supply and, particularly, it relates to a power source device which can be detachably mounted in a separate device.

2. Description of the Related Art

Heretofore, a power source device which is built in a camera, for example, to drive a diaphragm included in a lens unit or the like has been publicly known in the art. Such power source device has problems as described below.

In case where such power source device is applied to the construction in which the lens unit is detachably mounted in the camera, it is important to precisely control the timing of supplying power to the lens unit.

Particularly in case where the power source is applied to the construction in which microcomputers are included in the lens unit and the camera body, respectively, and an electric motor is included in the lens unit to drive the diaphragm or the like, there is the possibility of causing serious damage owing to short-circuiting of signal lines of the microcomputers.

The unit including the electric motor consumes considerable amount of power, as compared with the amount consumed by the lens unit including ROM or like component only. Accordingly, there is more possibility of causing serious damage as described above.

There is a further problem in that a limited power of the power source included in the camera body will be exhausted in a relatively short time if it is employed in inefficient manner.

In order to solve the problems as described above, it has been proposed to provide a system of this kind which includes a switch or like means for detecting whether the lens has been mounted or not and control means for controlling the supply of power to the lens in accordance with the operation of said switch (see U.S. Pat. No. 4,464,034).

This system also involves problems as hereinafter described.

In such system the detecting switch may be turned ON, owing to intention or negligence, even if the lens has not been actually mounted. If the switch is turned ON, a high voltage is applied to a power supply terminal at the side of the lens and said power supply terminal can very easily come into contact with a communication terminal of the microcomputer at the side of the camera body or the lens unit. If the power supply terminal came into contact with the communication terminal of the microcomputer, the respective microcomputers would be subjected to unrecoverable damage. Such damage can occur not only in the case of the communication terminal of the microcomputer but also in the case of a terminal to which a precise electric circuit is connected.

Even in the case where the lens was mounted on the camera body, if this lens is an unsuitable lens which cannot be controlled by the side of the camera body, the continued supply of power would result in considerable waste of the power.

Particularly, if a predetermined command was fed from the side of the camera body to such unsuitable lens unit, it is not foreseeable how the command is executed by the microcomputer at the side of the lens unit.

In a particular case, an erroneous execution may be effected to constantly feed electric current to the motor for driving the diaphragm. In such case, the power source at the side of the camera body will be exhausted in a very short time.

The problem as described above can occur not only in the case of the combination of the camera body and the lens unit detachably mounted on the camera body but also in the case of the combination of a power source device for controlling a power supply and an external device which receives the power from said power source device.

SUMMARY OF THE INVENTION

It is a first object of the present invention to solve the problems as described above.

It is a second object of the present invention to provide a power source device in which the timing of a supply of power from the general power source device to an external device detachably connected to said power source device can be controlled in efficient manner.

It is a third object of the present invention to provide a power supply system in which wasteful consumption of power is avoided between the power source device and a device which receives power supply from said power source device.

In accordance with a preferred mode of the present invention, there is provided a power source device in which the connection of the power source device with an external device is firstly confirmed and when a predetermined output of control means of the power source device is produced, the power is supplied to said external device.

In accordance with another mode of the present invention, there is provided a power source device in which the power is supplied from the power source device to the external device, depending upon the completion of connection of the power source device with the external device, a first signal is transmitted to said external device and then the supply of power is stopped if a predetermined signal is not fed back to the power source device.

In accordance with further mode of the present invention, there is provided a power source device in which the power source device and the external device can be connected through a power supply line and communication DATA line and BUSY line, the power is supplied from the power source device to the external device, depending upon the completion of connection of the power source device with the external device, the decision is made as to whether both of the DATA line and the BUSY line are in predetermined states or not, and then the power supply is stopped if the lines are not in the predetermined states.

The other objects of the present invention will be understood from the detailed explanation concerning the preferred embodiment as described below.

BRIEF DESCRIPTION OF THE DRAWINGS

FIG. 6 shows flowchart FIGS. 6A and 6B combined, wherein FIGS. 6A and 6B is a showing the operation of the camera at the time of mounting the lens unit thereon.

FIG. 9 is a flowchart showing the operation of the lens unit.

DETAILED DESCRIPTION OF THE PREFERRED EMBODIMENT

Now the invention will be explained with reference to the drawings which illustrate the preferred embodiment of the invention.

Before giving detailed description to the embodiment of the invention, the outline of the invention will be explained with reference to FIG. 1.

Figure 1:
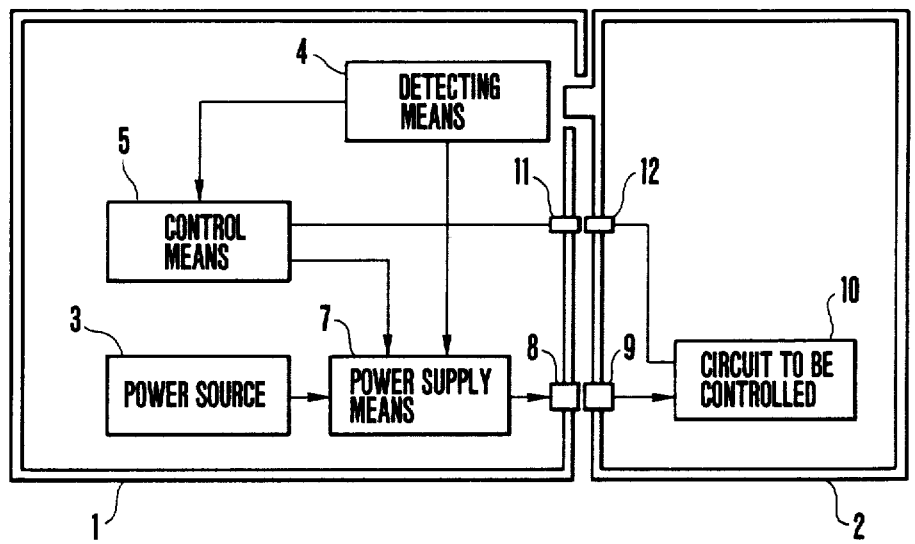
FIG. 1 is a block diagram illustrating the outline of the present invention.

In FIG. 1, 1 designates the power source device and 2 designates the first device to which the power is supplied from said power source device. The power source device 1 includes a detecting means 4 for detecting the connection and the disconnection of the power source device 1 and the first device 2, a control means 5 for effecting predetermined operation in accordance with the connection and the disconnection of the power source device 1 and the first device 2, a power supply means 7 for effecting the a supply of power from the power source to the first device 2, and a power source 3.

8 and 9 designate contacts for effecting the power supply and 10 designates a circuit to be controlled in said first device 2. 11 and 12 designate contacts for effecting communication of signals.

In the construction as shown in FIG. 1, the connection of the power source device 1 with the first device 2 is detected by the detecting means 4. The detecting means 4 has a relatively high speed response characteristic.

Upon the connection of the device 1 with the device 2, the control means 5 starts its predetermined operation. The control means 5 has relatively low speed response to the connection and the disconnection.

When both of the output of detecting means 4 indicating the mounting and the predetermined output of said control means have been obtained, the power supply means 7 is conducted so that the power is supplied from the power source 2 to the circuit 10 to be controlled in the first device 2. Accordingly, even if the terminals 11, 12 or other part comes into contact with the terminals 8, 9 at the time of disconnecting the power source device 1 from the first device 2 during the operation of the control means 5, no damage can occur because the power supply means 7 is held in its non-operating state by the detecting means having high response speed and, consequently, the power source line is shut down. If only the detecting means 4 operates but the control means 5 does not effect proper operation, the power supply means does not operate, so that wasteful supply of power is avoided. Depending upon the mounting of the first device 2, the control means 5 feeds a command signal to check a keyword, as a first signal, to the first device 2 through the terminals 11, 12. When the first device 2 receives said command, it firstly returns said command to the control means and then returns the keyword which has been previously stored in the first device 2, as a predetermined signal.

The control means 5 acts to decide whether the returned keyword is a predetermined keyword or not and, if not, stop the supply of power.

In case where the detecting means 4 of the power source device 1 detected the state of mounting of the device 2 which was not actually mounted, owing to intention or negligence, the control means 5 feeds the command to check the keyword through the terminals 11, 12, according to the detection effected by the detecting means 4, but in this case the keyword previously stored in the first device 2 is not returned to the device 1 through the terminal 11, so that the supply of power by the power supply means 7 is stopped.

Now, the embodiment of the present invention applied to the power supply from the camera body to the camera accessory, for example the lens unit, will be explained with reference to FIG. 2.

Figure 2:
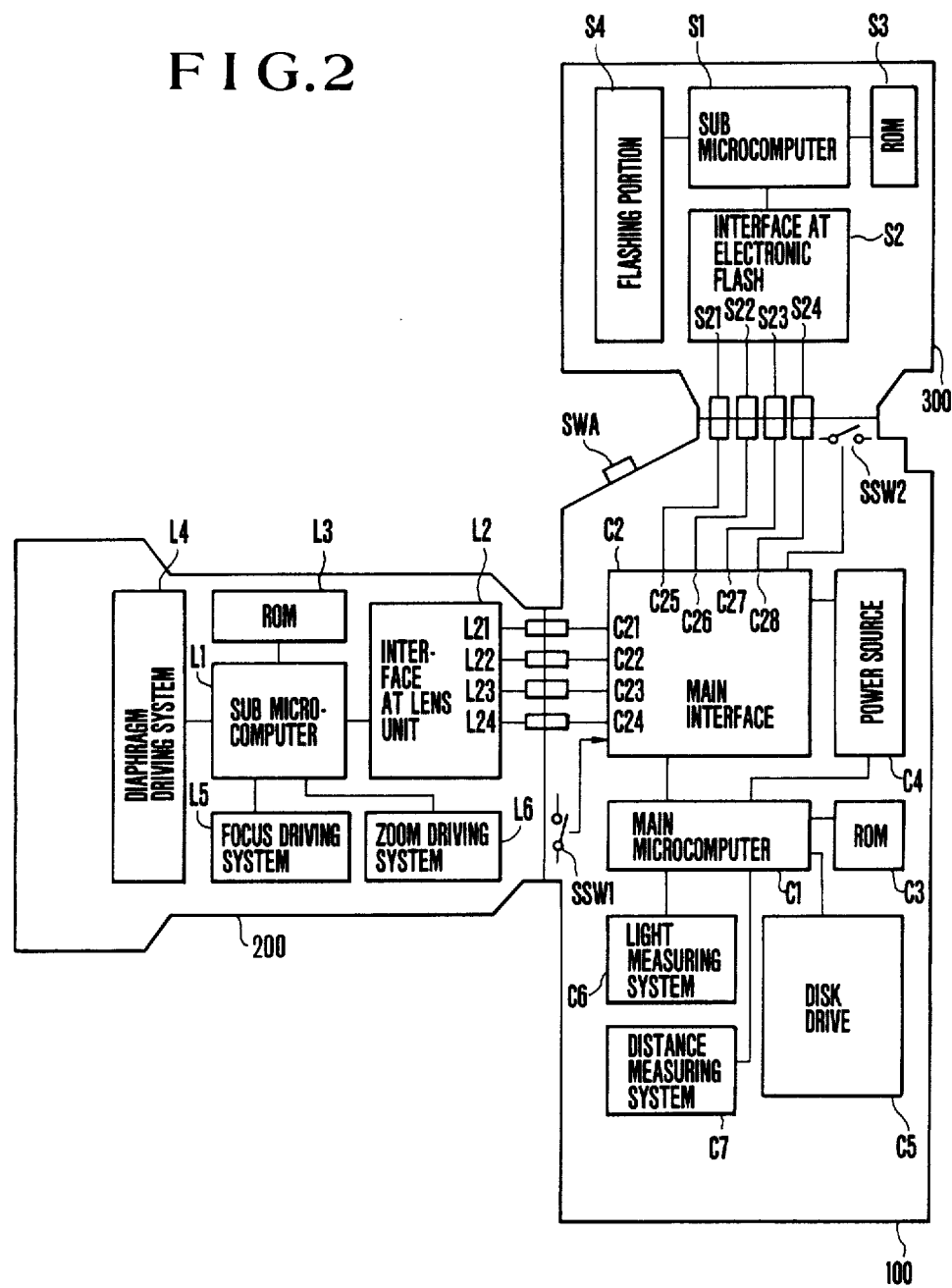
FIG. 2 is a block diagram of a camera system including a camera body and a lens unit, to which is applied the power source device according to the present invention.

FIG. 2 is a block diagram of the construction of an electric camera 100, as an example of the power source device according to the present invention.

In FIG. 2, C1 designates a main microcomputer and C2 designates a main interface which includes power output terminals C21 and C25, DATA terminals C22 and C26, BUSY terminals C23 and C27, and GND terminals C24 and C28. C3 is a ROM, C4 is a power source portion, C5 is a disk drive portion, C6 is a light measuring system, C7 is a distance measuring system, SSW1 and SSW2 are safety switches forming detecting means, and SWA is a switch which responds to a first stage of operation of a release button of the camera. 200 indicates a lens unit, which constitutes the first device, which is detachably mounted on the camera 100. L1 designates a sub-microcomputer and L2 designates an interface provided at the side of the lens unit, which includes a power terminal L21, a DATA terminal L22, a BUSY terminal L23 and GND terminal L24. L3 is a ROM, L4 is a diaphragm driving system, L5 is a focus driving system and L6 is a zoom driving system.

300 designates an electronic flash unit included in the first device. S1 is a sub-microcomputer and S2 is an interface provided at the side of the electronic flash unit, which includes a power terminal S21, a DATA terminal S22, a BUSY terminal S23 and a GND terminal S24. S3 is a ROM and S4 is a flashing portion.

Now the fundamental connection of the power source device with the first device will be explained with reference to an example in which the lens unit is used as the first device.

In this regard it will be understood that the present invention is not limited to the application of the power source device to the camera but it may include all of the applications thereof to various electronic instruments in general. The first device may include all of accessory instruments which can be detachably mounted on said electronic instruments. The detection means is not limited to a mechanical switch but may be a photosensitive switch, magnetic sensor or the like.

Figure 3:
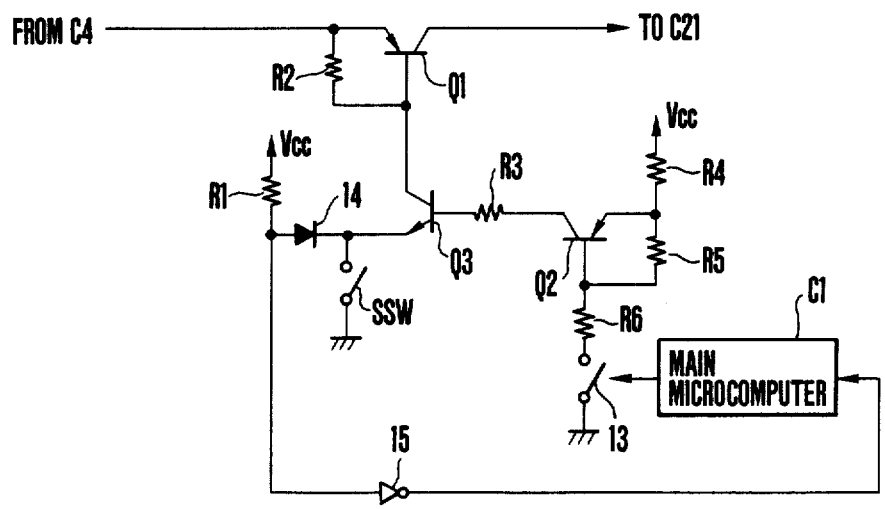
FIG. 3 is a circuit diagram showing the construction of the essential part of the main interface circuit C2 shown in FIG. 2.

FIG. 3 is a circuit diagram showing the construction of the essential part of the main interface circuit C2 of the power source device according to the present invention. Q1, Q2 and Q3 indicate switching transistors. The transistor Q1 is arranged in the supply line connected from the power source C4 to the power terminal C21 at the side of the camera. SSW is a safety switch which is turned ON when the lens unit 200, the first device, has been mounted on the camera 100.

Figure 4:
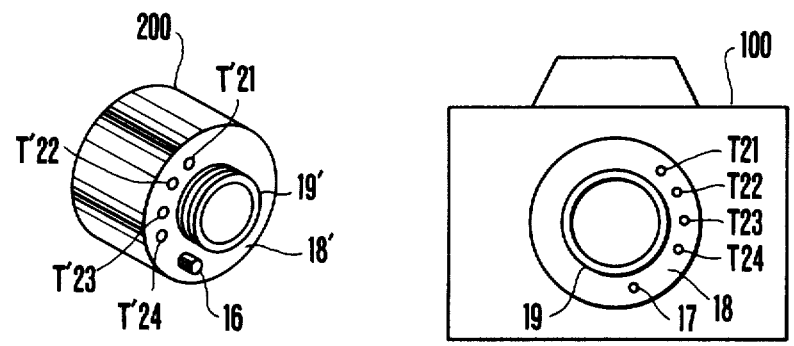
FIG. 4 illustrates the relation of connection between the lens unit and the camera body.

FIG. 4 shows the manner of mounting the lens unit on the camera. As shown in FIG. 4, the lens unit 200 has a screw thread 19' formed at the end thereof and the lens unit 200 can be mounted on the camera 100 by threading said screw thread 19' into a screw thread 19 formed on the camera.

When the screw threads 19 and 19' have been completely connected, an end surface 18' of the lens unit 200 comes into contact with a corresponding end surface 18 of the camera 100.

At this stage, terminals T'21–T'24 connected to the terminals L21–L24 of the interface L2 at the side of the lens unit come into contact with the terminals T21–T24 connected to the terminals C21–C24 of the main interface C2, respectively, and thus the terminals C21–C24 and the terminals L21–L24 are connected together.

At this time, an elastic projection 16 formed on the lens unit 200 comes into engagement with a recess 17 formed on the camera 100, whereby the switch SSW1 is turned ON.

Returning to FIG. 3, when the switch SSW1 is turned ON, a current passes from a constant voltage Vcc through a resistor R1 and a diode 14 and the anode of the diode 14 becomes at low level.

This low level is inverted by an inverter 15 and fed into the main microcomputer C1.

When the input is fed into the microcomputer, it starts its operation according to the program as explained below.

When a predetermined output signal is produced from the main microcomputer C1, a switch 13 is turned ON. Only when the safety switch SSW is turned ON and, at the same time, the predetermined output of the main microcomputer C1 produced, as described above, the switch 13 is turned ON.

When the switch 13 is turned ON, a current passes through a resistor R4, the emitter-base circuit of the transistor Q2 and a resistor R6, and the transistor Q2 is turned ON. As the result of turning ON of the transistor Q2, a current passes through a resistor R3 connected in the emitter-base circuit of the transistor Q3 and thus the transistor Q3 is turned ON. By turning ON the transistor Q3, the transistor Q1 is turned ON, whereby the supply of power is allowed from the power source portion C4 in the camera 100 to the lens unit 200.

Figure 5:
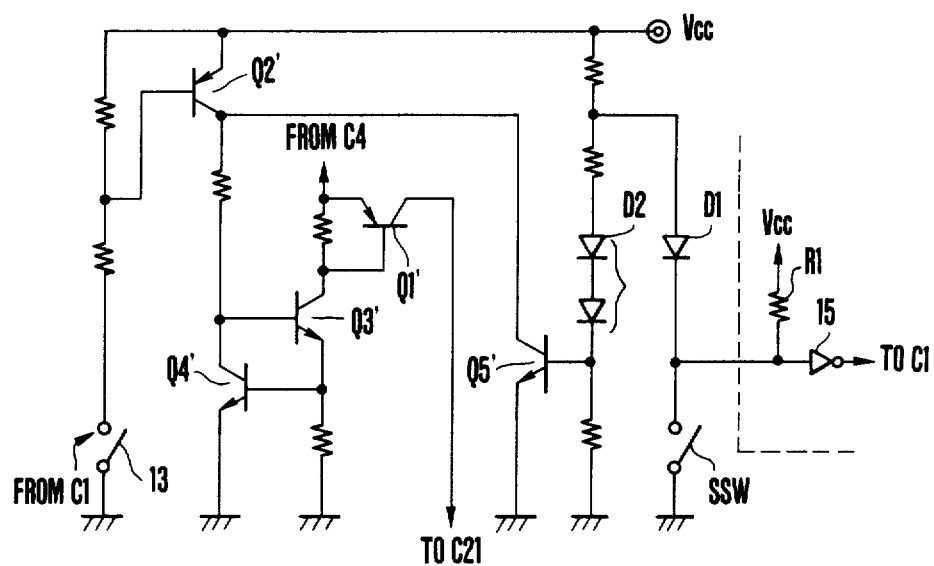
FIG. 5 is a diagram showing the details of the circuit shown in FIG. 3.

FIG. 5 shows another embodiment of the circuit shown in FIG. 3. In FIG. 5, Q1'–Q5' indicate transistors and D1–D3 indicate diodes.

When the switch SSW is held ON, no current passes to the diode D2, so that the transistor Q5' is kept OFF.

At this stage, if the switch 13 is turned ON by the signal fed from the microcomputer C1, the transistor Q2' is turned ON and the current passes to the base of the transistor Q3', thereby turning ON the transistor Q3'. The transistor Q4' serves to stabilize the operation of the transistor Q3'. As the result of turning ON of the transistor Q3', the transistor Q1' is turned ON and thus the power is supplied from the power source portion C4 in the camera to the lens unit.

On the other hand, when the switch SSW is OFF, a current passes to the diode D2 and the transistor Q5' is turned ON. At this stage, the transistor Q1' is kept OFF, independently of ON or OFF of the switch 13.

Figure 6B:
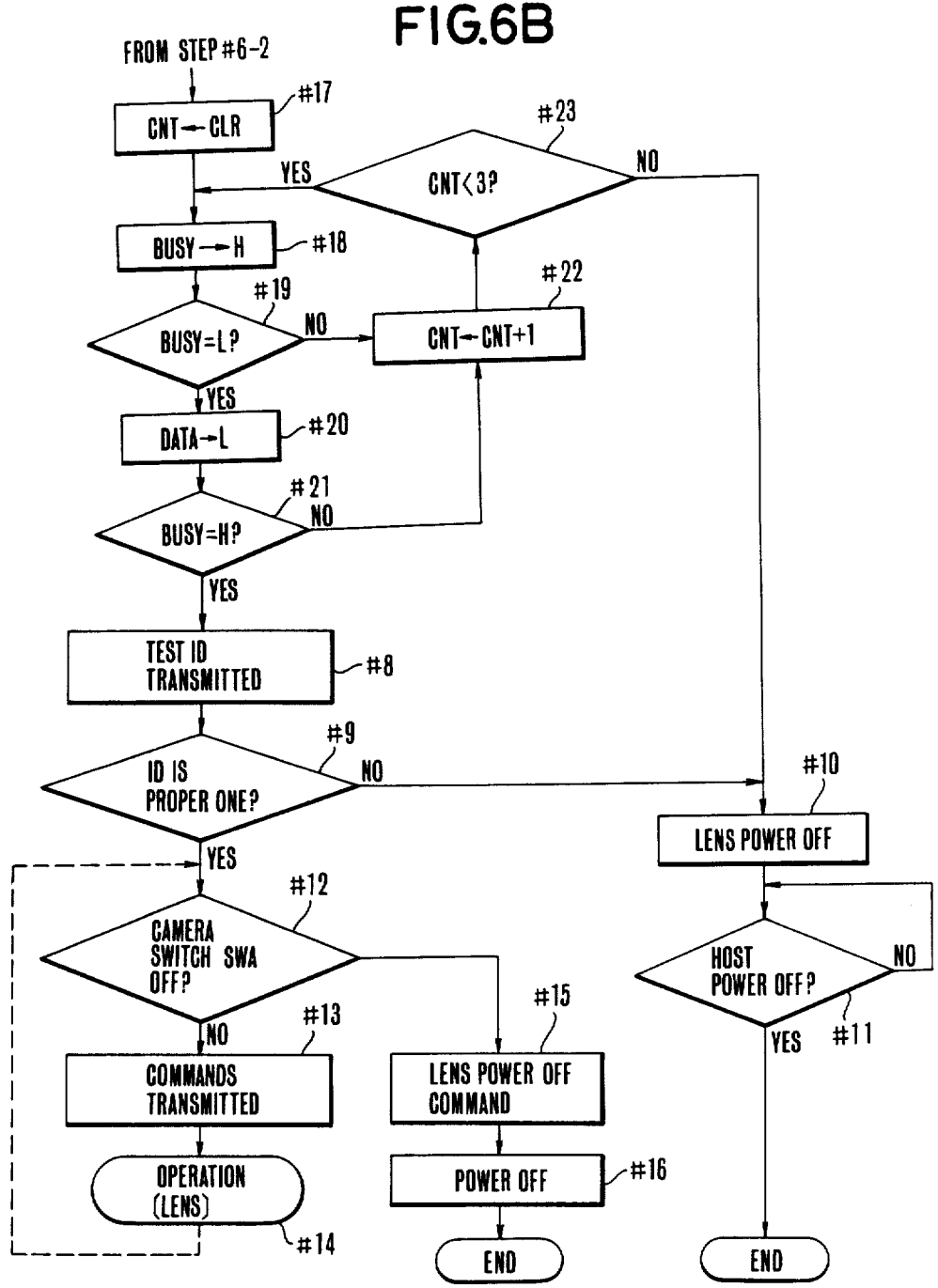

FIG. 6 is a flowchart showing the operation of the main microcomputer C1.

Firstly, at the step #1, power is supplied to the main microcomputer C1.

Then, at the step #2, a decision is made on whether the switch SSW is ON or not. This decision is effected according to whether the output of the inverter 15 is at high level or low level.

If the switch SSW is OFF, the switch 13 is turned OFF and the transistor Q1 is turned OFF (step #3). Thus, the power is not supplied to the lens unit. If the switch SSW is ON, the switch 13 is turned ON at the step 4. Thereby, the transistor Q1 is turned ON and the power is supplied to the lens unit.

Thereafter, the DATA line is made to be at low level at the step #5 (Breaking of the line). This state is held for a short time, for example 1m sec.

The sub-microcomputer L1 is automatically reset thereby. The data communicated through the DATA line is previously so set that it does not hold the low level state for more than 1 m sec. At the following steps, the DATA line is again made to be at high level and the initializing of the lens side is started. The initializing corresponds, for example, to driving the lens unit to open the diaphragm of the lens unit.

Firstly, decision is made on whether an NG code from the lens unit was received or not and if it was decided that no code was received, the flow is divided to the step #6-3, while if it was decided that the code was received, the flow is divided to the step #6-2.

The NG code is a code which is transmitted if the initializing was not completed or any abnormal state occurred.

If no NG code was received, decision is made on whether the sufficient time to effect the initializing elapsed or not (step #6-2) and after the time elaspsed, the flow proceeds to the step #17.

If the NG code was received at the step #6-1, the power supply to the lens is immediately stopped in order to avoid the continuation of the abnormal state. (step #6-3). Then, a warning is displayed (step #6-4), and a decision is made again on whether the switch SSW is ON or not (step #6-5). If the lens is demounted from the camera body and the switch SSW is not ON, the flow returns to the step #1. If the switch is ON, decision is made on whether the camera switch SWA is OFF or not (step #6-6). If the switch is OFF, the flow is divided to the step #15, while, if the switch is not OFF, the steps #6-5 and #6-6 are repeated, so that the power supplied to the lens is held inhibited. Then, at the step 17, check count is cleared.

Then, at the step #18, the BUSY line of the main interface C2 is made to be at high level. At this stage, if the sub-microcomputer L1 of the lens unit is in signal receiving state, the BUSY line becomes at low level, independently of the operation at the side of the camera.

At the step #19, decision is made on whether the BUSY line is at high level or not and if it is at high level, the check count is incremented by 1 (step #22). At the first stage, the check count is cleared at #17, so that the check count starts from zero. Therefore, the check count becomes "1". Then, at the step 23, decision is made on whether the count value is smaller than 3 or not and, if it is smaller than 3, the step is returned to the step 18, where the check of the BUSY line is effected. If the BUSY line is at high level after three times repetition of the steps 18, 19, 22 and 23, the step is transferred from #23 to #10 and the switch 13 is turned OFF. Then, at the step 11, decision is made on whether the power source for the main microcomputer C1 is OFF or not and, if it is OFF, the program is ended.

Thus, according to the embodiment as described above, whether the state of the sub-microcomputer is an abnormal state where it cannot receive the DATA from the main microcomputer or not is checked, judging from the fact that in the normal state, the BUSY line is held at low level under the action of the sub-microcomputer L1 even if the BUSY line is turned into high level by the action from the camera side and such check operation is effected at several times, whereby the error of the check operation itself is avoided.

Thus the precision of the check operation can be increased.

When the BUSY line at the side of the sub-microcomputer is in the state where it can receive signals, that is, when the BUSY line is at low level at the step #19, the step proceeds to the step #20, and the DATA line at the camera side is turned into low level.

This embodiment is so constructed that the BUSY line is turned into high level when the data terminal 22 is at low level for a predetermined time, as hereinafter described with reference to FIG. 9 and, consequently, the BUSY line at the side of the sub-microcomputer should be at high level in the normal state. Therefore, a decision is made on whether the BUSY line at the side of the lens unit is at high level or not, at the step #21, and if it is at low level, the check count is increased again at the steps #22 and #23. When the check at the steps #18-#23 has been repeated for three times, the step proceeds to the steps #10 and #11, as hereinbefore described.

If it is decided that the BUSY line at the side of the lens unit is at high level at the step #21, it is assumed that the BUSY line involves no breakage or the like and the step proceeds to the next step #8.

At the step #8, a command "TEST ID" is transmitted to the lens unit. By transmitting this command, an ID code is transmitted from the lens unit, as hereinafter described, and this ID code is checked. If the ID code is not a proper one, the supply of power to the sub-microcomputer is broken at the stage #10.

If the ID code is a proper one, the step proceeds to the step #12. Whether the main microcomputer C1 at the side of the camera is ON or not is confirmed. If the main microcomputer C1 is not ON, a command is transmitted at the step #15 to the lens unit, to operate the diaphragm to its open position, for example. The states of the other devices 2 can be reset thereby. Then the step proceeds to the step #16, where the switch 13 is turned OFF and the power supplied to the lens is stopped. If it is decided that the power source of the main microcomputer C1 is switched on at the step #12, the step proceeds to the step #13 and various commands are transmitted as hereinafter described. By these commands the states of the various parts in the lens unit are controlled. The step #13 and the step #14 are continued until the switch SWA turns OFF.

Figure 7:
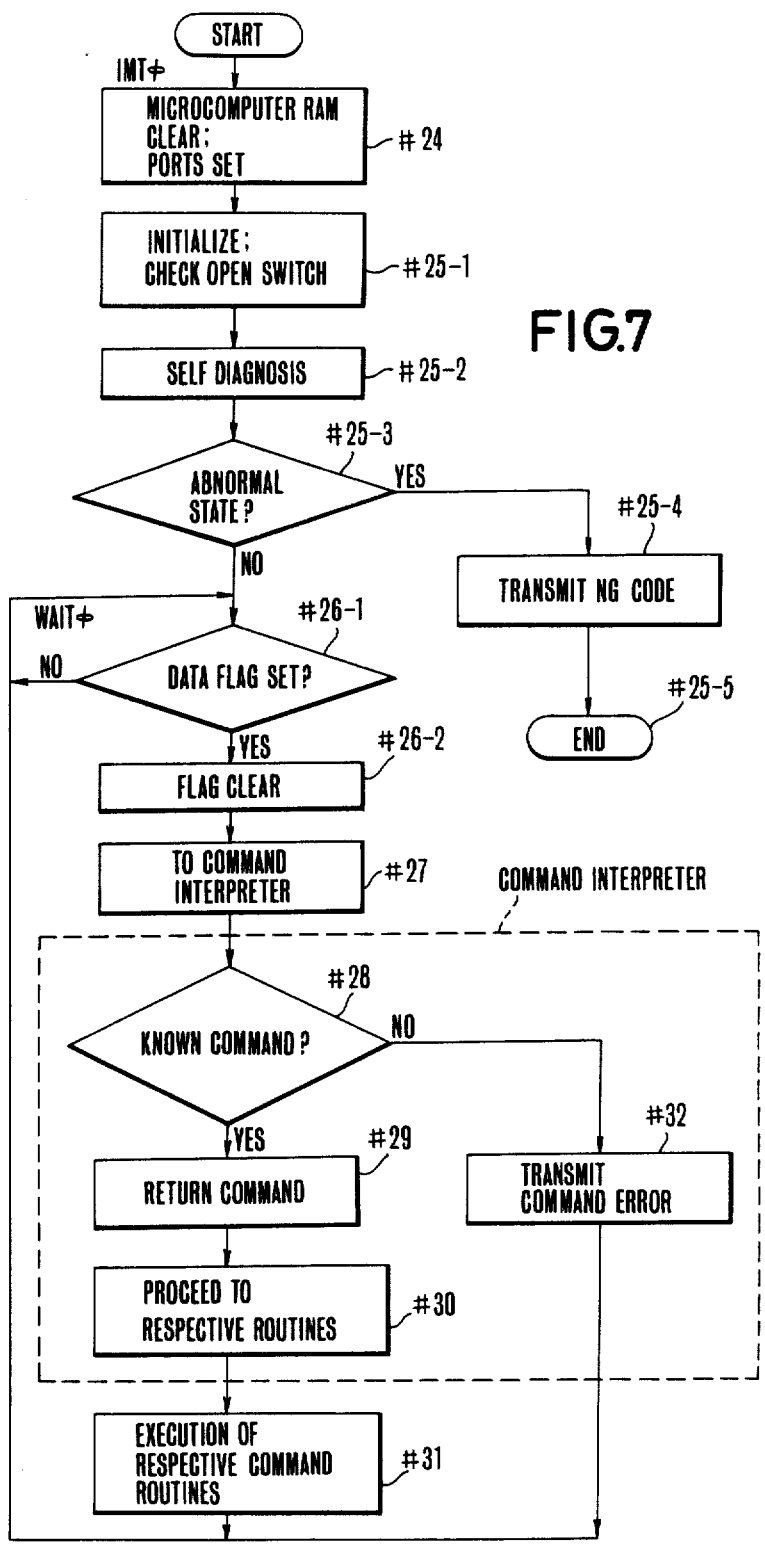
FIG. 7 is a flowchart showing the operation of the lens unit at the time of mounting the lens unit on the camera.

FIG. 7 is a flowchart showing the operation at the side of the lens unit. When the DATA becomes high level at the step #6 in FIG. 6, the RAM in the sub-microcomputer is cleared at the step #24. The respective ports of the interface at the side of the lens unit are set such that the DATA terminal becomes high level and the BUSY terminal becomes low level.

Then, at the step #25-1 the initializing of the condition of lens, for example, initializing of the diaphragm is effected to set a predetermined opening state. When the diaphragm becomes into the open state, an open switch OSW (not shown) is turned ON.

Then, a decision is made on whether the initializing was normally effected or not (step #25-2) to detect if the abnormal state exists. If the abnormal state exists, the NG code is transmitted to the camera body (step #25-4) and the flow ends (step #25-5). If no abnormal state exists, the flow proceeds to the step #26-1.

At the step #25-3, the flow may proceed to the step #25-4 when it was detected that the normal operation was not effected at the side of the lens, independently of whether the utilizing was normally effected or not.

Then, at the step #26-1, whether the command has been transmitted from the camera or not is decided from the state of DATA flag, which will be hereinafter described with reference to FIG. 9, and, if it is decided that the command has been transmitted, the DATA flag is cleared (step #26-2) and the step proceeds to the step #27, where a command is set to a command ineterpreter. In the command interpreter, whether said command is included in the store of the ROM L3 or not is decided at the step #28. If included, the command is returned to the camera (#29).

At the same time, the flow jumps to the routine corresponding to said command at the step #30. Said routine is executed at the step #31 and then the step is returned to command wait state at the step #26. In case where the command is not stored in the ROM L3 at the step #28, the command error signal is signal is sent to the camera at the step #32 and the step is returned to the command wait state at the step #26.

Figure 8:
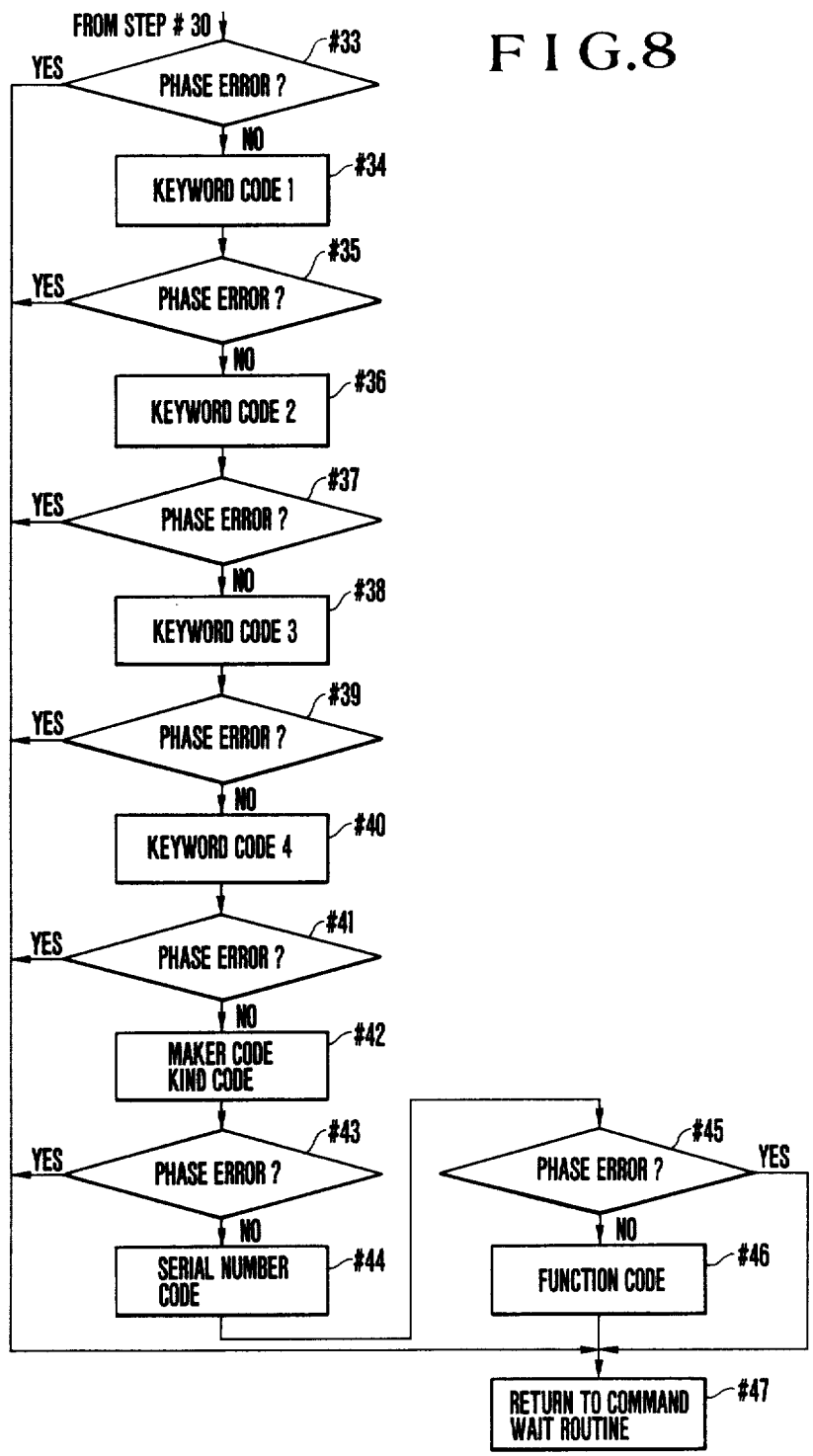
FIG. 8 is a flowchart showing the operation of transmission of signal from the lens unit replying to the command "TEST ID".

FIG. 8 shows the details of the step #31 at the side of the lens relating to the command "TEST ID" for testing ID at the step #8 shown in FIG. 6, and it is executed at the step #30 shown in FIG. 7. The operation relating to such command is as follows. Firstly, whether there is a phase error or not is decided at the step #33. If the DATA terminal of the main interface at the side of the camera is at low level or the BUSY terminal is at high level, it is impossible to transmit the DATA from the lens side. At the above-mentioned step 33, the levels of the DATA line and the busy line.

If there is a phase error, the step proceeds to the step #34 and a keyword code 1 is sent to the camera. The keyword code is selected from the ASCII character series and it is set to include many repetitions of 0 and 1. That is, it includes high rise and fall characteristics. It results in producing effects of improving the selflocking characteristic and facilitating the detection of error. In the particular embodiment the following code is used.

"0101 0011 0101 0010 0010 1010 0101 1010"

In this code, the first 1 byte "0101 0011" is used as keyword 1, the next 1 byte "0101 0010" is used as keyword 2, the next 1 byte "0010 1010" is used as keyword 3, and the next 1 byte "0101 1010" is used as keyword 4.

As hereinbefore described, the keyword code 1 is transmitted to the camera at the step #34. Then a decision is made on whether there is phase error or not at the step #35 and, if not, the keyword code 2 is transmitted at the step #36. Then the phase error is detected at the step #37 and, if there is no error, the keyword code 3 is transmitted at the step #38. The phase error is detected at the step 39 and, if there is no error, the keyword code 4 is transmitted at the step #40. Then the phase error is detected at the step #41 and, if there is no error, the maker code and the kind code are transmitted at the step #42. The maker code and the kind code consist of 4 bits, respectively, and The maker code is comprised of a combination of 0's and 1's.

The kind code is prepared as shown in the following Table 1.

TABLE 1

| Kind code | Content |
|---|---|
| 00 | single lens |
| 01 | zoom lens |
| 10 | adapter |
| 11 | misc. |
| 00 | wide-angle lens |
| 01 | standard lens |
| 10 | telephoto lens |
| 11 | super-telephoto lens |

Therafter, the phase errror is detected at the step #43 and, if no error, the serial number code is transmitted (step #44). The serial number code consists of 1 byte and indicates the serial number of the lens unit. Such a serial number is used, for example, to distinguish a new product series from an old product series, when a change has been made in the product series.

Then, the phase error is detected at the step #45 and, if there is no error, a1 byte function code is transmitted at the step #45.

The function code is so arranged that the respective bits indicate the characteristic features of the lens unit. For example, lowest series of bits indicates existence of AF and the next series of bits indicates existence of macroposition. Various informations can be entered into the remaining bits.

If the error was detected at the respective phase error detecting steps #33, #35, #37, #39, #41, #43 or #45, or if the transmissin of the function code at the step #47 was ended, the step proceeds to the command wait routine at the step #47.

Accordingly, the decision is effected at the step 26 in FIG. 7 until the next command is received.

If it is decided that the keyword code is not a proper one at the step indicated by #9 in FIG. 6 as explained above, the operation of the main microcomputer C1 at the side of the camera is stopped. The flow is divided from the step #9 to the step #10 as shown in FIG. 6 and the power supplied to the lens is stopped.

FIG. 9 is a flowchart showing the interruption routine executed by the sub-microcomputer L1 provided at the side of the lens unit. When the DATA terminal 22 of the lens unit becomes low level, the interruption is started and this routine is executed.

Firstly, a decision is made on whether the DATA terminal L22 holds low level for a predetermined time, for example over 10μ sec., or not (#48). If the low level is not held it is assumed that data from the camera, and the flow returns to the step which was being executed before starting the interruption, and if it is decided that the DATA terminal holds low level for the predetermined time, the BUSY terminal L23 is set at high level and sends an information to the camera that it received the DATA (#49). Then, the level of the DATA terminal is adopted as data and sampling is made progressively by 8 bits at the interval of 10μ sec. A decision is made on whether the DATA terminal L22 holds high level for a predetermined time, which is different from the above-mentioned predetermined time, for example more than 20μ sec, or not (#51). If the high level is not held, it is assumed that the dated sampled at the stage #50 is not accurate and the flow returns to the step which was being executed before starting the interruption. If the high level is held, the DATA flag is set (#52) and then the flow returns to the step which was being executed before starting the interruption.

The above interruption routine makes it possible to decide whether the lens unit has been mounted on the camera or not in a very short time, only by deciding the states of the BUSY line and DATA line as shown in the steps #17–#21 in FIG. 6.

According to the embodiment as described above, the power supplied to the lens unit is stopped if the lens unit, which forms the first device, has no proper ID code or if the predetermined condition between the camera and the lens unit is not satisfied. Therefore, wasteful consumption of power is avoided.

Further, according to the above embodiment, the abnormal condition of the lens unit can be detected by decision of the states of the DATA line and the BUSY line of the lens unit, which forms the first device, and consequently, it is possible to instantly find a failure of the lens unit. Moreover, the power supplied to the lens unit is shut down, so that leakage of electric power is prevented.

According to the embodiment as described above, it is possible to read out all of the required informations from the lens unit by sending one command from the camera to the lens unit to detect the ID code or the like, so that the time required for transmission and reception of signals between the camera and the lens unit can be considerably reduced. It is also possible to effect transmission and reception of more informations in a limited time.

Accordingly, it is possible to control the state of the external device, such as lens unit, in fine manner at high speed.

Further, according to the embodiment, it is possible to prepare keyword codes in common to the respective ones of the interchangeable lens units and read out the code by the first command fed from the camera, and, accordingly, it is possible to read out the ID information in the most efficient manner.

In the case where the keyword code is divided into a plurality of units (e.g. byte) and whether a phase error relatively to the camera exists or not, is decided every time the code of each unit is sent to the camera, the mistake of code cannot occur since the code is resent from beginning at each time of sending the codes.

With regard to the ID code or others, the phase error is detected for each of the units, and therefore, the same advantage can be attained.

It will be understood that the present invention provides a device in which even after the first device has been simply mounted on the power source device or the detecting means has started its detecting operation simply by a fault or a mistake, the supply of power to the first device is stopped if a first signal is sent to the first device after starting the supply of power but a predetermined signal is not sent back to the power source device. Accordingly, economical and efficient supply of power is possible and no damage can occur at the side of the power source device as well as at the side of the first device.

What is claimed is:

1. A system consisting of a combination of a power source device and an external device detachably connected to said power source device, comprising:
   (A) the power source device including
      (a) power supply means for supplying power according to the connection of said power source device with said external device, and
      (b) control means for transmitting a first signal to said external device after starting the supply of power to said external device and then stopping the supply of power of said power supply means if a predetermined signal from said external device is not detected; and
   (B) the external device including
      (a) a first terminal for receiving the power supplied from said power supply means, and
      (b) means for transmitting said predetermined signal when said first signal is transmitted.

2. A system according to claim 1, wherein said power source device further includes
   detecting means for detecting the connection of said external device.

3. A system according to claim 2, wherein said power supply means supplies the power to said external device depending upon a detection of said detecting means.

4. A system according to claim 1, wherein said power source device further includes:
   (a) a first terminal for supplying power to said external device by said power supply means; and
   (b) a second terminal for transmitting said first signal to said external device.

5. A system according to claim 1 wherein said power source device further includes:
   (a) a third terminal for receiving a predetermined signal from said external device.

6. A system according to claim 4, wherein said power source device further includes:
   (a) a third terminal for receiving a predetermined signal from said external device.

7. A system according to claim 6, wherein said second terminal and said third terminal are combined with each other to form a single terminal.

8. A system according to claim 1, wherein the control means of said power source device includes:
   (a) means for transmitting said second signal to said external device after starting the supply of power to said external device;
   (b) means for deciding whether a predetermined signal is transmitted to the power source device from the external device after transmitting said first signal; and
   (c) means for stopping the supply of power it is decided that said predetermined signal was not transmitted by said deciding means.

9. A system according to claim 1, wherein said first signal is a signal for causing said external device to return said predetermined signal.

10. A system according to claim 1, wherein said external device further includes:
    (a) means for storing said predetermined signal.

11. A system according to claim 10, wherein said storing means is a means for storing said predetermined signal at an address depending upon said first signal.

12. A system according to claim 11, wherein said external device further includes:
    (a) means for detecting said first signal; and
    (b) control means for reading said predetermined signal from said storing means in accordance with the detection effected by said detecting means.

13. A system according to claim 1, wherein said external device further includes:
    (a) a terminal for receiving said first signal.

14. A system according to claim 1, wherein said external device further includes:
    (a) a terminal for transmitting said predetermined signal.

15. A system according to claim 13, wherein said power source device further includes:
    (a) a terminal for transmitting said predetermined signal.

16. A system according to claim 15, wherein the terminal for receiving said first signal and the terminal for transmitting said predetermined signal are combined with each other.

17. A power source device which can be detachably connected to an external device, comprising:
    (a) power supply means for supplying power to said external device, depending upon the connection of said external device with said power source device; and
    (b) control means for transmitting a first signal to said external device after starting the supply of power to said external device and then stopping the supply of power of said power supply means if a predetermined signal from said external device is not detected.

18. A power source device according to claim 17, further comprising
    detecting means for detecting the connection of said external device.

19. A power source device according to claim 18, wherein said power supply means supplies the power to said external device depending upon the detection of said detecting means.

20. A power source device according to claim 17, further comprising:
    (a) a first terminal for supplying power to said external device by said power supply means; and
    (b) a second terminal for transmitting said first signal to said external device.

21. A power source device according to claim 17, further comprising:
    (a) a third terminal for receiving a predetermined signal from said external device.

22. A power source device according to claim 20, further comprising:
    (a) a third terminal for receiving a predetermined signal from said external device.

23. A system according to claim 22, wherein said second terminal and said third terminal are combined with each other to form a single terminal.

24. A power source device according to claim 17, wherein said control means includes:
    (a) means for transmitting said second signal to said external device after starting the supply of power to said external device;
    (b) means for deciding whether a predetermined signal is transmitted to the power source device from the external device after transmitting said first signal; and
    (c) means for stopping the supply of power when it is decided that said predetermined signal was not transmitted by said deciding means.

25. A power source device according to claim 17, wherein said first signal is a signal for causing said external device to return said predetermined signal.

26. A camera system, including a combination of a camera body and an accessory unit, comprising:
(A) the camera body including
(a) power supply means for supplying power according to the connection of said accessory unit to said camera body, and
(b) control means for transmitting a first signal to said accessory unit after starting the supply of power to said accessory unit and then stopping the supply of power effected by said power supply means if a predetermined signal from said accessory unit is not detected; and
(B) the accessory unit including
(a) a terminal for receiving power supplied from said power supply means, and
(b) means for transmitting said predetermined signal when said first signal is transmitted.

27. A camera system according to claim 26, wherein said camera body includes detecting means for detecting connection of said accessory unit.

28. A system according to claim 27, wherein said power supply means supplies power to said accessory unit, depending upon the detection effected by said detecting means.

29. A system according to claim 27, wherein said camera body further includes:
(a) a first terminal for supplying power to said accessory unit by said power supply means; and
(b) a second terminal for transmitting said first signal to said accessory unit.

30. A system according to claim 26, wherein said camera body further includes:
(a) a third terminal for receiving the predetermined signal from said accessory unit.

31. A system according to claim 29, wherein said power source device further includes:
(a) a third terminal for receiving the predetermined signal from said accessory unit.

32. A system according to claim 31, wherein said second terminal and said third terminal are combined with each other to form a single terminal.

33. A system according to claim 26, wherein the control means of said camera body includes:
(a) means for transmitting said second signal to said external device after starting the supply of power to said accessory unit;
(b) means for deciding whether a predetermined signal is transmitted to the camera body from the accessory unit after transmitting said first signal; and
(c) means for stopping the supply of power when it is decided that said predetermined signal was not transmitted by said deciding means.

34. A system according to claim 26, wherein said first signal is a signal for causing said accessory unit to return said predetermined signal.

35. A system according to claim 26, wherein said accessory unit further includes:
(a) means for storing said predetermined signal.

36. A system according to claim 35, wherein said storing means is a means for storing said predetermined signal at an address depending upon said first signal.

37. A system according to claim 36, wherein said accessory unit further includes:
(a) means for detecting said first signal; and
(b) control means for reading said predetermined signal from said storing means in accordance with the detection effected by said detecting means.

38. A system according to claim 26, wherein said accessory unit further includes:
(a) a terminal for receiving said first signal.

39. A system according to claim 26, wherein said accessory unit further includes:
(a) a terminal for transmitting said predetermined signal.

40. A system according to claim 38, wherein said accessory unit further includes:
(a) a terminal for transmitting said predetermined signal.

41. A system according to claim 40, wherein the terminal for receiving said first signal and the terminal for transmitting said predetermined signal are combined with each other.

42. A system according to claim 26, wherein said accessory unit is a lens unit.

43. A camera body which supplies power to an accessory unit which can be detachably mounted on the camera body, comprising:
(a) power supply means for supplying power according to the connection of said accessory unit to said camera body; and
(b) control means for transmitting a first signal to said accessory unit after starting the supply of power to said accessory unit and then stopping the supply of power effected by said power supply means if a predetermined signal from said accessory unit is not detected.

44. A camera body according to claim 43, further comprising detecting means for detecting connection of said accessory unit.

45. A camera body according to claim 44, wherein said power supply means supplies power to said accessory unit, depending upon the detection effected by said detecting means.

46. A camera body according to claim 51, further comprising:
(a) a first terminal for supplying power to said external device by said power supply means; and
(b) a second terminal for transmitting said first signal to said external device.

47. A camera body according to claim 43, further comprising:
(a) a third terminal for receiving a predetermined signal from said external device.

48. A camera body according to claim 46, further comprising:
(a) a third terminal for receiving a predetermined signal from said external device.

49. A camera body according to claim 46, wherein said second terminal and said third terminal are combined with each other to form a single terminal.

50. A camera body according to claim 43, wherein said control means includes:
(a) means for transmitting said second signal to said external device after starting the supply of power to said accessory unit;
(b) means for deciding whether a predetermined signal is transmitted to the camera body from the accessory unit after transmitting said first signal; and
(c) means for stopping the supply of power when it is decided that said predetermined signal was not transmitted by said deciding means.

51. A camera body according to claim 43, wherein said first signal is a signal for causing said accessory unit to return said predetermined signal.

52. A system consisting of a combination of an electrical power source device and an external device including electro-mechanical energy conversion means, detachably connected to said power source device, comprising:
(A) the electrical power source device including
  (a) electrical power supply means for supplying electrical power after the connection of said power source device with said external device, and
  (b) control means for transmitting a first signal to said external device after starting electrical supply to said external device and then controlling said power supply means such that said electro-mechanical energy conversion means does not operate if a predetermined signal from said external device is not detected; and
(B) the external device including
  (a) means for receiving power supplied from said electrical power supply means,
  (b) means for transmitting said predetermined signal when said first signal is transmitted, and
  (c) said electro-mechanical energy conversion means for converting electrical power received by said receiving means to mechanical power.

53. A system according to claim 52, wherein said power source device further includes
detecting means for detecting the connection of said external device.

54. A system according to claim 53, wherein said power supply means supplies the power to said external device depending upon the detection by said detecting means.

55. A system according to claim 52, wherein said power source device further includes:
  (a) a first terminal for supplying power to said external device by said power supply means; and
  (b) a second terminal for transmitting said first signal to said external device.

56. A system according to claim 52, wherein said power source device further includes:
  (a) a terminal for receiving a predetermined signal from said external device.

57. A system according to claim 55, wherein said power source device further includes:
  (a) a third terminal for receiving a predetermined signal from said external device.

58. A system according to claim 57, wherein said second terminal and said third terminal are combined with each other to form a single terminal.

59. A system according to claim 52, wherein the control means of said power source device includes:
  (a) means for transmitting said second signal to said external device after starting the supply of power to said external device;
  (b) means for deciding whether a predetermined signal is transmitted to the power source device from the external device after transmitting said first signal; and
  (c) means for stopping the supply of power when it is decided that said predetermined signal was not transmitted by said deciding means.

60. A system according to claim 52, wherein said first signal is a signal for causing said external device to return said predetermined signal.

61. A system according to claim 52, wherein said external device further includes:
  (a) means for storing said predetermined signal.

62. A system according to claim 61, wherein said storing means is a means for storing said predetermined signal at an address depending upon said first signal.

63. A system according to claim 62, wherein said external device further includes:
  (a) means for detecting said first signal; and
  (b) control means for reading said predetermined signal from said storing means in accordance with the detection effected by said detecting means.

64. A system according to claim 52, wherein said external device further includes:
  (a) a terminal for receiving said first signal.

65. A system according to claim 52, wherein said external device further includes:
  (a) a terminal for transmitting said predetermined signal.

66. A system according to claim 64, wherein said power source device further includes:
  (a) a terminal for transmitting said predetermined signal.

67. A system according to claim 66, wherein the terminal for receiving said first signal and the terminal for transmitting said predetermined signal are combined with each other.

68. A power source device, which can be detachably connected to an external device including electro-mechanical energy conversion means, comprising:
  (a) electrical power supply means for supplying electrical power to said external device, after the connection of said external device with said power source device; and
  (b) control means for transmitting a first signal to said external device after starting an electrical supply to said external device and then controlling said power supply means such that said electro-mechanical energy conversion means does not operate if a predetermined signal from said external device is not detected.

69. A power source device according to claim 68, further comprising
detecting means for detecting the connection of said external device.

70. A power source device according to claim 69, wherein said power supply means supplies the power to said external device depending upon the detection of said detecting means.

71. A power source device according to claim 68, further comprising:
  (a) a first terminal for supplying power to said external device by said power supply means; and
  (b) a second terminal for transmitting said first signal to said external device.

72. A power source device according to claim 68, further comprising:
  (a) a terminal for receiving a predetermined signal from said external device.

73. A power source device according to claim 71, further comprising:
  (a) a third terminal for receiving a predetermined signal from said external device.

74. A power source device according to claim 73, wherein said second terminal and said third terminal are combined with each other to form a single terminal.

75. A power source device according to claim 68, wherein said control means includes:

(a) means for transmitting said second signal to said external device after starting the supply of power to said external device;
(b) means for deciding whether a predetermined signal is transmitted to the power source device from the external device after transmitting said first signal; and
(c) means for stopping the supply of power when it is decided that said predetermined signal was not transmitted by said deciding means.

76. A power source device according to claim 68, wherein said first signal is a signal for causing said external device to return said predetermined signal.

77. An external device which can be detachably connected to a power source device including power supply means, means for transmitting a firtt signal after starting an electrical supply and then controlling said power supply by said power supply means if a predetermined signal from said external device is not detected, comprising:
(a) means for receiving power supplied from said power supply means;
(b) means for transmitting said predetermined signal when said first signal is transmitted; and
(c) electro-mechanical energy conversion means for converting electrical power received by said receiving means to mechanical power.

78. An external device according to claim 77, further comprising:
(a) means for storing said predetermined signal.

79. An external device according to claim 78, wherein said storing means is a means for storing said predetermined signal at an address depending upon said first signal.

80. An external device according to claim 79, further comprising:
(a) means for detecting said first signal; and
(b) control means for reading said predetermind signal from said storing means in accordance with the detection effected by said detecting means.

81. An external device according to claim 77, further comprising:
(a) a terminal for receiving said first signal.

82. An external device according to claim 77, further comprising:
(a) a terminal for transmitting said predetermined signal.

83. An external device according to claim 81, further comprising:
(a) a terminal for transmitting said predetermined signal.

84. An external device according to claim 83, wherein the terminal for receiving said first signal and the terminal for transmitting said predetermined signal are combined with each other.

85. A camera system including combination of a camera body and an accessory unit including electro-mechanical energy conversion means, comprising:
(A) the camera body including
(a) electrical power supply means for supplying electrical power after the connection of said accessory unit to said camera body, and
(b) control means for transmitting a first signal to said accessory unit after starting an electrical supply to said accessory unit, and then controlling a power supply effected by said power supply means such that said electro-mechanical energy conversion means does not operate if a predetermined signal from said accessory unit is not detected; and
(B) the accessory unit including
(a) means for receiving power supply from said electrical power supply means,
(b) means for transmitting said predetermined signal when said first signal is transmitted, and
(c) said electro-mechanical energy conversion means including diaphragm drive unit for converting electrical power received by said receiving means to mechanical power.

86. A camera system according to claim 85, wherein said camera body includes detecting means for detecting connection of said accessory unit.

87. A camera system according to claim 86, wherein said power supply means supplies power to said accessory unit.

88. A camera system according to claim 86, wherein said power supply means supplies power to said accessory unit, depending upon the detection effected by said detecting means.

89. A camera system according to claim 86, wherein said camera body further includes:
(a) a first terminal for supplying power to said accessory unit by said power supply means; and
(b) a second terminal for transmitting said first signal to said accessory unit.

90. A camera system according to claim 85, wherein said camera body further includes:
(a) a terminal for receiving the predetermined signal from said accessory unit.

91. A camera system according to claim 89, wherein said power source device further includes:
(a) a third terminal for receiving the predetermined signal from said accessory unit.

92. A camera system according to claim 91, wherein said second terminal and said third terminal are combined with each other to form a single terminal.

93. A camera system according to claim 85, wherein the control means of said camera body includes:
(a) means for transmitting said second signal to said external device after starting the supply of power to said accessory unit;
(b) means for deciding whether a predetermined signal is transmitted to the camera body from the accessory unit after transmitting said first signal; and
(c) means for stopping the supply of power when it is decided that said predetermined signal was not transmitted by said deciding means.

94. A camera system according to claim 85, wherein said first signal is a signal for causing said accessory unit to return said predetermined signal.

95. A camera system according to claim 85, wherein said accessory unit further includes:
(a) means for storing said predetermined signal.

96. A camera system according to claim 95, wherein said storing means is a means for storing said predetermined signal at an address depending upon said first signal.

97. A camera system according to claim 99, wherein said accessory unit further includes:
(a) means for detecting said first signal; and
(b) control means for reading said predetermined signal from said storing means in accordance with the detection effected by said detecting means.

98. A camera system according to claim 85, wherein said accessory unit further includes:

(a) a terminal for receiving said first signal.

99. A camera system according to claim 85, wherein said accessory unit further includes:
(a) a terminal for transmitting said predetermined signal.

100. A camera system according to claim 98, wherein said accessory unit further includes:
(a) a terminal for transmitting said predetermined signal.

101. A camera system according to claim 100, wherein the terminal for receiving said first signal and the terminal for transmitting said predetermined signal are combined with each other.

102. A camera system according to claim 85, wherein said accessory unit is a lens unit.

103. A camera system according to claim 102, wherein said electro-mechanical energy conversion means is a focus driving means.

104. A camera system according to claim 102, wherein said electro-mechanical energy conversion means is a zoom driving system.

105. A camera system according to claim 102, wherein said electro-mechanical energy conversion means is a diaphragm driving system.

106. A camera body which supplies electrical power to an accessory unit which can be detachably mounted on the camera body and includes electro-mechanical energy conversion means, comprising:
(a) electrical power supply means for supplying electrical power after the connection of said accessory unit to said camera body; and
(b) control means for transmitting a first signal to said accessory unit after starting an electrical supply to said accessory unit, and then controlling a power supply effected by said power supply means such that said electro-mechanical energy conversion means does not operate if a predetermined signal from said accessory unit is not detected.

107. A camera body according to claim 106, further comprising detecting means for detecting connection of said accessory unit.

108. A camera body according to claim 107, wherein said power supply means supplies power to said accessory unit, depending upon the detection effected by said detecting means.

109. A camera body according to claim 106, further comprising:
(a) a first terminal for supplying power to said external device by said power supply means; and
(b) a second terminal for transmitting said first signal to said accessory unit.

110. A camera body according to claim 106, further comprising:
(a) a terminal for receiving a predetermined signal from said accessory unit.

111. A camera body according to claim 109, further comprising:
(a) a third terminal for receiving a predetermined signal from said accessory unit.

112. A camera body according to claim 111, wherein said second terminal and said third terminal are combined with each other to form a single terminal.

113. A camera body according to claim 106, wherein said control means includes:
(a) means for transmitting said second signal to said accessory unit after starting the supply of power to said accessory unit;
(b) means for deciding whether a predetermined signal is transmitted to the camera body from the accessory unit after transmitting said first signal; and
(c) means for stopping the supply of power when it is decided that said predetermined signal was not transmitted by said deciding means.

114. A camera body according to claim 106, wherein said first signal is a signal for causing said accessory unit to return said predetermined signal.

115. An accessory unit which can be detachably connected to a camera body including power supply means and means for transmitting a first signal after starting an electrical supply, and then controlling a power supply by said power supply means if a predetermined signal from said accessory unit is not detected, comprising:
(a) means for receiving power supplied from said power supply means;
(b) means for transmittig a predetermined signal when said first signal is transmitted; and
(c) means for converting electrical power received by said receiving means to mechanical power.

116. An accessory unit according to claim 115, further comprising:
(a) means for storing said predetermined signal.

117. An accessory unit according to claim 116, wherein said storing means is a meansfor storing said predetermined signal at an address depending upon said first signal.

118. An accessory unit according to claim 117, further comprising:
(a) means for detecting said first signal; and
(b) control means for reading said predetermined signal from said storing means in accordance with the detection effected by said detecting means.

119. An accessory unit according to claim 115, further comprising:
(a) a terminal for receiving said first signal.

120. An accessory unit according to claim 115, further comprising:
(a) a terminal for transmitting said predetermined signal.

121. An accessory unit according to claim 120, wherein the terminal for receiving said first signal and the terminal for transmitting said redetermined signal are combined together.

122. An accessory unit according to claim 120. wherein the accessory unit is a lens unit.

123. An accessory unit according to claim 122, wherein said electro-mechanical energy conversion means is a focus driving means.

124. An accessory unit according to claim 122, wherein said electro-mechanical energy conversion means is a zoom driving system.

125. An accessory unit according to claim 122, wherein said electro-mechanical energy conversion means is a diaphragm driving system.

126. A camera system including a combination of a camera body having power supply means and an accessory unit having connection means which supplies received power from said power supply means to electro-mechanical energy conversion means, comprising:
(A) the camera body including
(a) said power supply means for supplying power after the connection of said accessory unit to said camera body; and
(b) control means for transmitting a first signal to said accessory unit after starting an electrical supply to said accessory unit, and then controlling a power supply effected by said power supply means such that said electro-mechanical energy conversion means is disabled if a predetermined signal from said accessory unit is not detected; and (B) the accessory unit including
  (a) means for receiving power supplied from said power supply means;
  (b) means for transmitting said predetermined signal when said first signal is transmitted; and
  (c) said connection means for supplying received power by said receiving means to said electro-mechanical energy conversion means.

127. A camera system according to claim 126, wherein said camera body includes detecting means for detecting connection of said accessory unit.

128. A camera system according to claim 127, wherein said power supply means supplies power to said accessory unit, depending upon the detection effected by said detecting means.

129. A camera system according to claim 126, wherein said camera body further includes:
  (a) a first terminal for supplying power to said accessory unit by said power supply means; and
  (b) a second terminal for transmitting said first signal to said accessory unit.

130. A camera system according to claim 126, wherein said camera body further includes:
  (a) a terminal for receiving the predetermined signal from said accessory unit.

131. A camera system according to claim 129, wherein said power source device further includes:
  (a) a third terminal for receiving the predetermined signal from said accessory unit.

132. A camera system according to claim 131, wherein said second terminal and said third terminal are combined with each other to form a single terminal.

133. A camera system according to claim 126, wherein said connection means is an interface unit provided in said accessory unit.

134. A camera system according to claim 126, wherein said accessory unit is a lens unit.

135. A camera system according to claim 134, wherein said electro-mechanical energy conversion means is a focus driving means.

136. A camera system according to claim 134, wherein said electro-mechanical energy conversion means is a zoom driving system.

137. A camera system according to claim 134, wherein said electro-mechanical energy conversion means is a diaphragm driving system.

138. A camera body which supplies electrical power to an accessory unit which can be detachably mounted on the camera body and includes connection means which supplies received power to electro-mechanical energy conversion means, comprising:
  (a) power supply means for supplying power after the connection of said accessory unit to said camera body; and
  (b) control means for transmitting a first signal to said accessory unit after starting an electrical supply to said accessory unit and then controlling a power supply effected by said power supply means such that said electro-mechanical energy conversion means is disabled if a predetermined signal from said accessory unit is not detected.

139. A camera body according to claim 138, wherein said camera body includes detecting means for detecting connection of said accessory unit.

140. A camera body according to claim 139, wherein said power supply means supplies power to said accessory unit, depending upon the detection effected by said detecting means.

141. A camera body according to claim 138, further comprising:
  (a) a first terminal for supplying power to said external device by said power supply means; and
  (b) a second terminal for transmitting said first signal to said accessory unit.

142. A camera body according to claim 138, further comprising:
  (a) a terminal for receiving a predetermined signal from said accessory unit.

143. A camera body according to claim 141, further comprising:
  (a) a third terminal for receiving a predetermined signal from said accessory unit.

144. A camera body according to claim 143, wherein said second terminal and said third terminal are combined with each other to form a single terminal.

145. A camera body according to claim 138, wherein said control means includes:
  (a) means for transmitting said second signal to said accessory unit after starting the supply of power to said accessory unit;
  (b) means for deciding whether a predetermined signal is transmitted to the camera body from the accessory unit after transmitting said first signal; and
  (c) means for stoppping the supply of power when it is decided that said predetermined signal was not transmitted by said deciding means.

146. A camera body according to claim 138, wherein said first signal is a signal for causing said accessory unit to return said predetermined signal.

147. An accessory unit which can be detachably connected to a camera body including power supply means and means for transmitting a first signal after starting electrical supply and then controlling a power supply if a predetermined signal from said accessory unit is not detected, comprising:
  (a) a terminal for receiving power supplied from said power supply means;
  (b) means for transmitting said predetermined signal when said first signal is transmitted; and
  (c) connection means for supplying power received by said receiving means to electro-mechanical energy conversion means.

148. An accessory unit according to claim 147, further comprising:
  (a) means for storing said predetermined signal.

149. An accessory unit according to claim 148, wherein said storing means is a means for storing said predtermined signal at an address depending upon said first signal.

150. An accessory unit according to claim 149, further comprising:
  (a) means for detecting said first signal; and
  (b) control means for reading said predetermined signal from said storing means in accordance with the detection effected by said detecting means.

151. An accessory unit according to claim 147, further comprising:
  (a) a terminal for receiving said first signal.

152. An accessory unit according to claim 147, further comprising:
(a) a terminal for transmitting said predetermined signal.

153. An accessory unit according to claim 151, further comprising:
(a) a terminal for transmitting said predetermined signal.

154. An accessory unit according to claim 153, wherein the terminal for receiving said first signal and the terminal for transmitting said predetermined signal are combined together.

155. An accessory unit according to claim 153, wherein the accessory unit is a lens unit.

156. A accessory unit according to claim 155, wherein said electro-mechanical energy conversion means is a focus driving means.

157. An accessory unit according to claim 155, wherein said electro-mechanical energy conversion means is a zoom driving system.

158. An accessory unit according to claim 155, wherein said electro-mechanical energy conversion means is a diaphragm driving system.

* * * * *